United States Patent [19]

Rowe

[11] 4,298,835
[45] Nov. 3, 1981

[54] VOLTAGE REGULATOR WITH TEMPERATURE DEPENDENT OUTPUT

[75] Inventor: Don H. Rowe, Portola Valley, Calif.
[73] Assignee: GTE Products Corporation, Stamford, Conn.
[21] Appl. No.: 70,078
[22] Filed: Aug. 27, 1979
[51] Int. Cl.³ .............................................. G05F 1/46
[52] U.S. Cl. ................................. 323/281; 323/349; 307/310
[58] Field of Search ....................... 323/19–20, 323/22 T, 68, 273, 275, 280, 281, 349, 350, 907; 307/310; 330/289

[56] References Cited

U.S. PATENT DOCUMENTS

| 3,470,457 | 9/1969 | Howlett | 323/22 T |
| 3,480,852 | 11/1969 | Hung | 323/20 |
| 3,781,642 | 12/1973 | Dutton | 323/22 T |
| 3,889,171 | 6/1975 | Hunter, Jr. | 323/20 X |
| 4,114,085 | 9/1978 | Leinonen et al. | 323/17 |
| 4,138,616 | 2/1979 | Turner | 307/310 |

Primary Examiner—William M. Shoop
Assistant Examiner—Peter S. Wong
Attorney, Agent, or Firm—John F. Lawler

[57] ABSTRACT

A solid state voltage regulator circuit having an output with absolute voltage change per degree centigrade temperature dependence comprises a voltage regulator having a forward control loop for sensing changes in regulated output voltage, and a temperature transducer having an output voltage connected to the forward loop and adapted to change the sensed regulated voltage input to the regulator in direct proportion to the absolute ambient temperature. The transducer output is connected to the forward loop by an amplifier and the circuit is readily adapted to any desired linear temperature dependence by adjustment of the gain of the amplifier.

1 Claim, 1 Drawing Figure

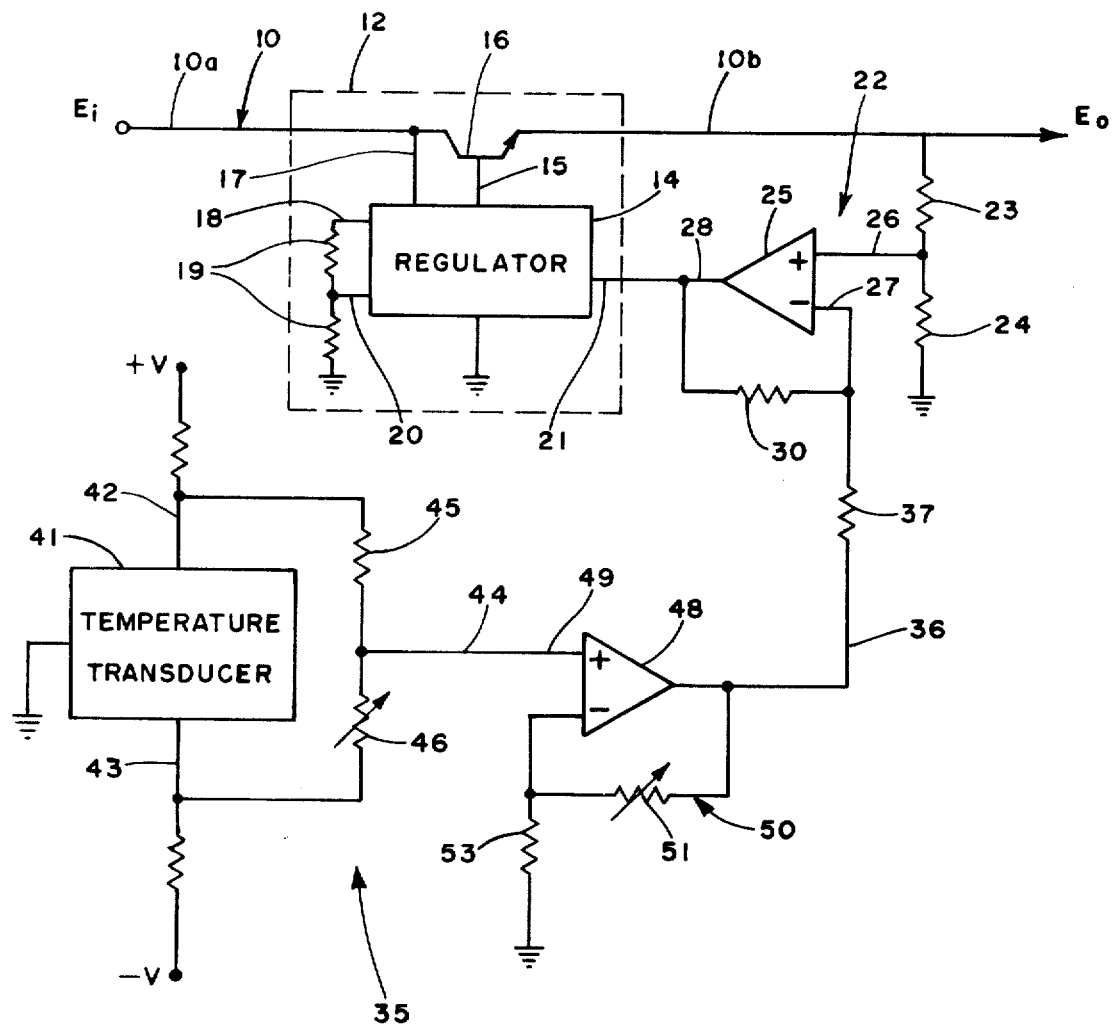

VOLTAGE REGULATOR WITH TEMPERATURE DEPENDENT OUTPUT

BACKGROUND OF THE INVENTION

This invention relates to voltage regulators and more particularly to such a regulator having a temperature dependent output.

The power supply of an avalanche photodetector (APD) used in fiber optic communications systems or similar optical detection systems is required to have a value of 325 to 450 volts DC as determined by each individual unit and to have a temperature dependence of +2 volts per degree centigrade to maintain a constant avalanche gain. Conventional techniques employed to achieve such regulation have used temperature sensitive elements such as thermistors which have a percentage change of resistance per degree change of temperature as determined by the thermistor composition. In order to adapt such temperature sensitive elements to the power requirement of an avalanche photodetector, sophisticated linearization networks are used with the elements. An example of such a network is described in Temperature Measurement Handbook published by Omega Engineering, Inc., Stamford, Connecticut. Such networks are not only costly and time consuming to design, but they also are inflexible in that the resultant resistance-temperature characteristic cannot be varied without redesigning the network. This invention is directed to an improved voltage regulator which provides the desired regulation for APDs without such linearization networks.

OBJECTS AND SUMMARY OF THE INVENTION

A general object of the invention is the provision of an improved voltage regulator circuit for providing a power supply with a temperature dependent output.

A further object is the provision of a temperature dependent voltage regulator that is readily and inexpensively adjustable to provide a plurality of temperature dependent outputs over a substantial range.

A more specific object is the provision of a voltage regulator which achieves a temperature dependence of an absolute voltage per degree temperature change without use of linearization networks.

These and other objects are achieved with a voltage regulator that is responsive to the output of a temperature transducer capable of producing a voltage proportional to absolute temperature. The transducer output is connected to the forward control loop of the regulator through an amplifier and is selectively adjustable to provide any of a plurality of temperature dependent characteristics simply by changing the gain of the amplifier.

The single drawing is a schematic diagram of a voltage regulator circuit embodying this invention.

DESCRIPTION OF PREFERRED EMBODIMENT

Referring now to the drawing, a circuit embodying the invention is there shown and comprises a line 10 having a first part 10a connected to an unregulated source of DC power, not shown, having a voltage $E_i$ and connected to regulator means 12 shown in the broken line rectangle, which produces on a second part 10b line 10 a regulated DC output voltage $E_o$. Regulator means 12 comprises a regulator 14 having an output terminal 15 connected to the base of power transistor 16 for varying the voltage on line 10 in proportion to the ouput of regulator 14. By way of example, regulator 14 may be an integrated circuit of the type manufactured and sold by National Semiconductor Corporation as type LM723. Power is provided from line 10 through terminal 17 to regulator 14 which generates a fixed reference voltage on terminal 18 connected by voltage divider 19 to terminal 20. This reference voltage on terminal 20 is compared to a voltage on terminal 21 in order to produce a difference voltage of opposite sign at output terminal 15 as described below.

In order to sense the value of the regulated voltage $E_o$ on line 10b, a forward control loop 22 is connected between line 10b and terminal 21 and comprises voltage dividing resistors 23 and 24 connected between ground and line 10b and amplifier 25. Amplifier 25 has a first or positive input terminal 26 connected between resistors 23 and 24 and a second or negative input terminal 27 and functions as a differential amplifier to algebraically add voltages at terminals 26 and 27 to produce a sum at output terminal 28 which is connected to regulator terminal 21. The function of resistor 30 connected between amplifier terminals 27 and 28 is to provide negative feedback and adjust the gain of the amplifier.

The regulated output voltage $E_o$ may be utilized to energize circuits or components which have temperature dependent characteristics requiring a predetermined absolute change in $E_o$ for each degree change in ambient temperature. Such a component, for example, is an avalanche silicon photodiode utilized as a photodetector in pulse lasers or fiber optic transmission systems. Proper operation of this photodiode requires a specific voltage increase, say +2 volts, in output $E_o$ for each degree centigrade increase in temperature. In accordance with this invention, such temperature dependent characteristic is provided by a temperature compensation circuit 35 connected by line 36 and resistor 37 to the terminal 26 of amplifier 25.

Circuit 35 comprises a temperature transducer 41 having terminals 42 and 43 connected to the positive and negative output terminals, respectively, of a DC power supply. The output of transducer 41 at line 44 is taken through voltage dividing resistors 45 and 46 connected to transducer terminals 42 and 43, respectively. Resistor 46 preferably is variable in order to provide an adjustment to compensate for initial calibration errors in the voltage output. Transducer 41 preferably is a monolithic integrated circuit of the type described in an article entitled "A Two-Terminal IC Temperature Transducer" by M.P. Timko, IEEE Journal of Solid State Circuits, Vol. SC—11, No. 6, December 1976, pages 784–788, and is commercially available, for example, from National Semiconductor Corporation (Model LM3911) and from Analog Devices, Wilmington, Massachusetts (Model AD590). The output on line 44 has an absolute voltage per degree centigrade characteristic, that is, the output voltage is directly proportional to absolute temperature.

The output of transducer 41 is amplified by a differential or operational amplifier 48 having one input terminal 49 connected to transducer output line 44 and having its output line 36 connected by a feedback loop 50 including variable resistor 51 to the other amplifier input terminal 52 across grounded resistor 53. The gain of amplifier 48 is conveniently controlled by adjustment of resistor 51 which varies the negative feedback to the amplifier. In this manner absolute voltage at line 36 generated by transducer 41 for each degree change in temperature is changeable and is readily selected to match the temperature dependent characteristic of the APD or similar circuit or device.

The output of amplifier 48 on line 36 is applied to terminal 27 of amplifier 25 and is algebraically added to the regulated voltage on input terminal 26 to produce the sum at output terminal 28. When there is a change in the ambient temperature environment of transducer 41 and of the temperature dependent device energized by the regulated voltage $E_o$, a change in the value of $E_o$ is induced which is directly proportional to absolute temperature as is required, for example, by APDs. To adapt this regulator circuit from use with one device having a specific temperature dependence characteristic, say 2 volts/°C. to use with another device with such a characteristic of 3 volts/°C., adjustment of the gain of amplifier 48 by variation of resistor 50 is all that is required.

What is claimed is:

1. A circuit for regulating voltage on a power supply output line comprising a voltage regulator having an input and an output connected to said output line.

said regulator being adapted to derive an error voltage at said regulator output for changing the voltages on said output line in a direction to reduce said error voltage substantially to zero, a differential amplifier having first and second inputs and an output connected to said input of said regulator, said amplifier being adapted to algebraically add voltages at said first and second inputs to produce the sum at the output, said first input said amplifier being connected to said output line whereby to sense the regulated voltage thereon, a temperature transducer having an output and being responsive to ambient temperature to produce a voltage at said transducer output characterized by an absolute voltage change per degree change of temperature, and means to connect said transducer output to the second input of said amplifier comprising an operational amplifier having a first input connected to the output of said transducer and a second input and an output, a feedback loop connected between said operational amplifier output and said second input of said operational amplifier and a variable resistor connected in said feedback loop, the resistive value of said variable resistor being determinative of the value of the amplification factor of said operational amplifier whereby to set the slope of the temperature-voltage characteristic of the circuit.

* * * * *